United States Patent [19]

Vandewinckel et al.

[11] Patent Number: 5,733,585
[45] Date of Patent: Mar. 31, 1998

[54] APPARATUS FOR ROTATIONALLY ALIGNING A FEATURE OF AN OPTICAL TOOL WITH A GATE IN AN INJECTION MOLDING APPARATUS

[75] Inventors: Jeffrey M. Vandewinckel, Macedon; Allen L. Ormiston, Fairport, both of N.Y.

[73] Assignee: Bausch & Lomb Incorporated, Rochester, N.Y.

[21] Appl. No.: 709,370

[22] Filed: Sep. 6, 1996

[51] Int. Cl.⁶ ................................................. B29B 45/03
[52] U.S. Cl. .................. 425/192 R; 425/808; 425/542; 264/1.1; 264/2.1; 264/2.5
[58] Field of Search ........................... 425/808, 190, 425/191, 192 R, 542; 264/1.1, 2.1, 2.5

[56] References Cited

U.S. PATENT DOCUMENTS

| | | | |
|---|---|---|---|
| 4,199,313 | 4/1980 | Bohnenberger | 425/408 |
| 4,208,364 | 6/1980 | Shepherd | 264/1 |
| 4,407,766 | 10/1983 | Haardt | 264/2.2 |
| 4,681,295 | 7/1987 | Haardt | 249/135 |
| 4,732,726 | 3/1988 | Grannen | 264/272.21 |
| 4,778,632 | 10/1988 | Bakalar | 264/2.2 |
| 4,815,690 | 3/1989 | Shepherd | 249/82 |
| 5,110,278 | 5/1992 | Tait | 425/175 |
| 5,221,538 | 6/1993 | Gasami | 425/127 |

Primary Examiner—Jay H. Woo
Assistant Examiner—Robert Hopkins
Attorney, Agent, or Firm—Katherine McGuire

[57] ABSTRACT

A selectively, rotatably adjustable riser pin for aligning a predetermined characteristic on an asymmetrical mold surface with the gate of an injection molding machine for enhanced flow dynamics of the mold material across the mold surface. The riser pin is divided into two co-linear portions which are biased towards one another such that application of a predetermined torque will allow the front riser pin portion, which carries the mold tool, to be rotated independently of the back riser pin portion.

8 Claims, 2 Drawing Sheets

APPARATUS FOR ROTATIONALLY ALIGNING A FEATURE OF AN OPTICAL TOOL WITH A GATE IN AN INJECTION MOLDING APPARATUS

BACKGROUND OF THE INVENTION

The present invention broadly relates to aligning a feature of a mold tool with the gate of the injection molding machine. More particularly, the present invention relates to apparatus for aligning an asymmetrical surface of an optical tool used for making contact lens molds, with the gate of the injection molding apparatus for enhanced flow dynamics of the mold material across the optical surface during the injection molding process.

Cast molding of contact lenses is well known in the art. The east molding process may be either be a complete cast molding process wherein two mold halves (anterior and posterior) are used to mold a lens, or it may be a partial cast molding process, e.g., wherein a lathing operation cuts one surface of a lens whose opposite surface has been cast. In either process, the mold in which the lens is east is typically injection molded and discarded after a single use due to degradation of the optical surface of the mold following a single casting operation. In a complete east molding process, anterior and posterior mold halves are provided which carry concave and convex optical surfaces for forming the anterior and posterior surfaces of the contact lens, respectively. The anterior and posterior mold halves are typically injection molded parts.

Cast molding of asymmetrical contact lenses presents unique manufacturing challenges as opposed to spherical contact lenses due to the rotationally asymmetrical configuration of the contact lens surface. For example, toric contact lenses, which are used to correct a non-spherical cornea or lens, includes a toric surface and must include ballast to properly orient the toric axis of the lens over the toric axis of the cornea or lens, used to correct a non-spherical cornea or lens, includes a toric surface and must include ballast to properly orient the toric axis of the lens over the toric axis of the cornea or lens.

In the area of cast molding of toric lenses, the toric surface may be placed on the posterior or anterior mold surface. As such, the toric surface is formed on the optical tool mold surface, which itself is typically made from a metal alloy. The optical tool which carries the mold surface is positioned in the injection molding machine and forms part of the cavity into which fluid mold material is injected and cured. It has been discovered that during the injection molding process of asymmetric surfaces, such as a contact lens mold surface having a toric feature, the flow dynamics of the fluid mold material over the mold tool surface will differ depending on the orientation of the toric surface on the mold tool surface to the flow direction of the fluid mold material emanating from the gate in the injection molding apparatus. If the flow dynamic is not equal across the entire asymmetric surface, undesirable variations may appear in the mold surface which will be transferred to the cast lens which must then be scrapped.

Heretofore, no attention was given to the orientation of the toric surface of an optical tool used to make toric contact lenses with respect to the gate in an injection molding apparatus. As such, the rotational relationship between the two could vary mold to mold, resulting in inconsistencies in the mold surface due to different flow dynamics for each variation in rotational relationship between the toric surface and the gate. Over and under-tightening of the optical elements in the mold machine also contributes to inconsistencies in rotational relationship.

SUMMARY OF THE INVENTION

The present invention addresses the problem of variations in an asymmetric mold surface due to inconsistent flow dynamics of liquid mold material over the mold surface by providing apparatus for permitting selective rotational adjustment of the mold tool relative to the gate in an injection molding apparatus. For the purposes of description, an optical tool carrying an asymmetrical toric surface will be described herein, although it is understood the invention is not limited to this specific feature of a mold surface, but instead may be applied to any tool having an asymmetrical mold surface.

The optical tool which includes the optical surface for forming the optical surface in the resultant mold is held in a multi-component assembly which includes an optical tool holder in which the optical tool is removably received, a riser pin, and a tail piece which is threaded at both ends and which threads to and joins the optical tool to the riser pin. The end of the riser pin opposite the tail piece is fixedly secured to a stationary back plate. An ejector sleeve is provided in which the optical tool, optical tool holder, tail piece and riser pin telescope, the ejector sleeve itself being telescopingly and slidingly positioned in a cavity block whereby it may be linearly extended relative to the other components to release the cured mold.

As mentioned above, the optical tool threads onto the front end of the tail piece whose back end threads into the front end of the stationary riser pin. Since the threads on the tail piece cannot be timed with the threads in the optical tool or the riser pin without undue effort and expense, the toric surface on the tool surface may come to rest at any arbitrary position relative to the gate of the injection mold machine. Operator under-tightening and over-tightening of the optical tool on the tail piece may further contribute to this arbitrary positioning. The present invention enables selective rotation of the optical tool to align the toric surface with the gate by mechanically separating the riser pin into two co-linear halves, one of which may rotate relative to the other half which is held stationary in the injection molding apparatus. Means are provided for adjustably biasing the two riser pin halves together such that once the tall piece has been fully threaded into the riser pin, application of a greater torque of a predetermined intensity will rotate the rotatable half of the riser pin relative to the stationary half until the toric surface on the mold tool is aligned with gate of the injection molding machine.

DETAILED DESCRIPTION

Figure 1:
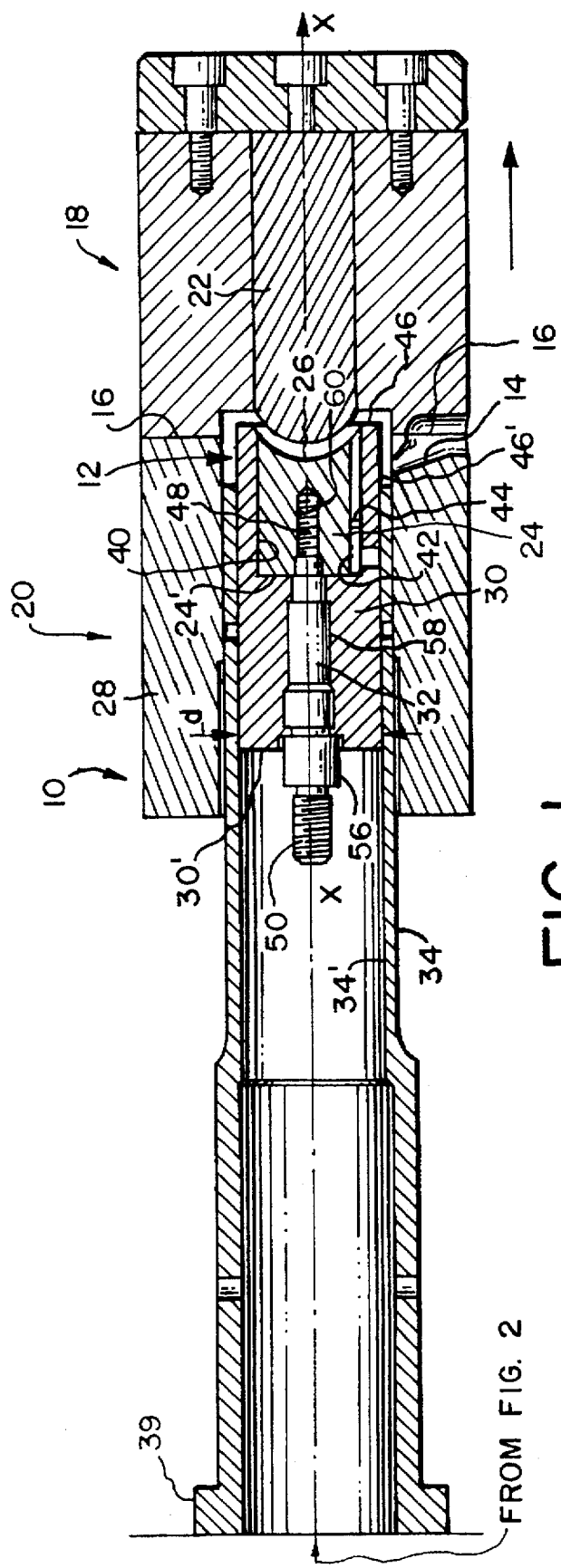
FIG. 1 is a longitudinal cross-sectional view of a posterior mold cavity assembly.

Referring to the drawing, there is seen in FIG. 1 a contact lens posterior mold cavity assembly 10 of an injection molding machine, it being understood the present invention may be applied in the anterior mold cavity assembly as well. Thus, the assembly 10 provides a mold cavity 12 in the shape of the posterior mold half of a two-piece contact lens mold used for cast molding toric contact lenses. Liquid mold material (e.g., polypropylene) is forced under high pressure through gate 14 into cavity 12 during the injection molding process. A dividing line 16 delineates the front cavity assembly 18 from the back cavity assembly 20. The from assembly 18 carries the front plug 22 which forms the non-optical, top surface of the resultant posterior mold while the back assembly 20 carries the optical tool 24 having optical surface 26 which forms the optical surface of the resultant posterior mold half (opposite the top surface). In the injection molding machine (not shown), from assembly 18 is in the position shown during formation of the mold half, and then moves linearly to the right along common longitudinal axis x—x to release the resultant mold half as described more fully below.

Figure 2:
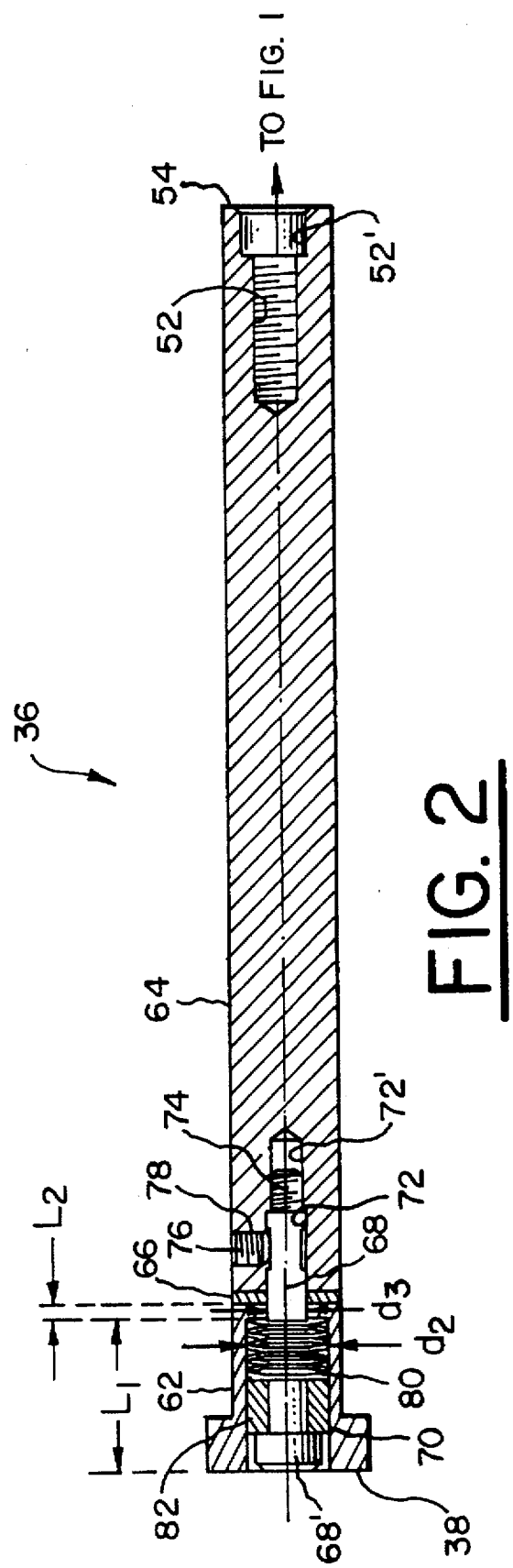
FIG. 2 is a longitudinal cross-sectional view of the riser pin according to the present invention for use in the mold assembly of FIG. 1.

Back assembly 20 generally comprises a back block 28, an optical tool 24, an optical tool holder 30, a posterior tail piece 32, an ejector sleeve 34, and a riser pin 36 (FIG. 2). The back end 38 of riser pin 36 is fixedly secured to a stationary back plate (not shown) in the injection molding machine, while the back end 40 of the ejector sleeve 34 is fixedly secured to a plate (not shown) movable along axis x—x in the injection molding machine. For the sake of clarity, riser pin 36 is shown separately from the cavity assembly of FIG. 1, but it is seen that riser pin 36 telescopes within ejector sleeve 34 in the fully assembled condition.

The optical tool holder 30 includes a cylindrical cavity 40 at the front end thereof wherein optical tool 24 may be removably inserted with optical surface 26 facing front block 18. Optical tool 24 is provided with a longitudinal slot 42 on the exterior side wall thereof which is aligned with the toric surface on optical surface 26 when the tool 24 is manufactured. Optical tool holder 30 includes a radially extending pin 44 on cylindrical cavity 40 over which slot 42 extends as optical tool 24 is inserted into cavity 40. With slot 42 engaging pin 44, optical tool 24 is rotationally fixed with respect to optical tool holder 30.

Posterior tail piece 32 is threaded at both the from and back ends 48 and 50 thereof, respectively. Prior to mounting optical tool 24 and optical tool holder 30 in back block 28, the back end 50 of posterior tall piece 32 is threaded into threaded bore 52 extending longitudinally into the front end 54 of riser pin 36. As previously mentioned, the back end 38 of riser pin 36 is fixedly secured to a back plate in the injection molding machine. With the back end 50 of posterior tall piece 32 thusly threaded into the front end 54 of riser pin 36, the neck 56 of posterior tall piece 32 is matingly received in the neck portion 52' of bore 52 in riser pin 36, leaving the threaded front end 48 of tail piece 32 exposed for receiving optical tool holder 30 and optical tool 24. It will also be noticed that riser pin 36 and thus also posterior tall piece 32 extend axially within and spaced radially inwardly from ejector sleeve 34 at this point.

A bore hole 58 is provided longitudinally through optical tool holder 30 from back end 30' thereof to cylindrical cavity 40. Optical tool 24 also includes a threaded bore hole 60, axially aligned with bore hole 58, and longitudinally extending from the back end 24' thereof to a point spaced from optical surface 26. With optical tool 24 fully inserted into the cylindrical cavity 40 of optical tool holder 30, and posterior tail piece 32 threaded into riser pin 34 as described above, the bore hole 58 of optical tool holder 30 is extended over and onto the front end 48 of posterior tail piece 32 until threaded end 48 meets the threaded bore hole 60 of optical tool 24.

It will be noticed that the inner diameter of the longitudinal passageway 34' of ejector sleeve 34 and the outer diameter of optical tool holder 30, both indicated by "d", are such that optical tool holder 30 is slidingly received in mating contact within ejector sleeve passageway 34' as optical tool holder 30 is passed over tall piece front end 48. The exposed from surface 46 of optical tool holder 30 extends slightly beyond parting line 16 and is hexed on the external side wall 46' thereof for engagement with a wrench for turning optical tool holder 30, together with optical tool 24, until the threaded front end 48 of posterior tail piece 32 is fully threaded into the threaded bore 60 of optical tool 24.

As discussed, optical tool 24 includes a longitudinal slot 42 which corresponds to the toric surface on optical surface 26, and slot 42 engages radial pin 44 in cavity 40 of the optical tool holder 30 when the tool 24 and holder 30 are attached together. A marking (not shown) is provided on the exposed front surface 46 of holder 30, which marking aligns longitudinally with pin 44. Thus, an operator of the injection molding machine may determine where the toric surface of the optical surface 26 lies upon attaching body 30 and optical tool 24 to tail piece 32 by observing where the marking on surface 46 comes to rest. Should the marking come to rest at a location off-set from gate 46, the operator may apply a greater torque to further rotate optical tool holder 30 and optical tool 24 until the marking is aligned with gate 16 and without stripping the threads of tail piece front end 48 and bore hole 60 as follows.

Referring to FIG. 2, riser pin 36 is divided into co-linear back and front portions 62 and 64, with a brass washer 66 being provided therebetween. A shoulder screw 68 is extended through axially aligned bore holes 70 and 72 formed entirely through back riser pin portion 62 and a length of front riser pin portion 64, respectively, with the threaded end 74 of screw 68 threading into the threaded portion 72' of bore 72. A set screw 76 extends through a radially extending hole 78 formed in front riser portion 64 to engage the shank of shoulder screw 68 thereby rotationally fixing shoulder screw 68 within front riser pin portion 64.

It will be noticed bore hole 70 in back riser pin portion 62 is of a first diameter $d_2$ for a first length $L_1$ thereof where $d_2$ is slightly greater than the outer diameter of head portion 68' of shoulder screw 68, and is of a second, smaller diameter $d_3$ for a second length $L_2$ thereof where $d_3$ is only very slightly larger than the shank portion of screw 68 where it exits first riser pin portion 62 and passes through washer 66 and into second riser pin portion 64. The portion of the shank &screw 68 which extends through back riser pin portion 62 is thus spaced radially inwardly from the wall of bore hole 70. A plurality of spring washers 80 (e.g., Belleville spring washers) are stacked within the first bore hole length L1, abutting the shoulder created between lengths $L_1$ and $L_2$. A brass bushing 82 is positioned between the washers 80 and the head portion 68' of screw 68. Spring washers 80 are stacked in series relationship and provide a force of a predetermined magnitude biasing first and second riser pin portions 62 and 64 together. The biasing force may be increased or decreased as needed by alternately tightening and loosening the shoulder screw 68 in threaded bore 72' of the second riser pin portion 64. The amount of biasing force present between riser pin portions 62 and 64 dictates the amount of torque which is required to go from static friction (where first and second riser pin portions 62 and 64 are rotationally stationary with respect to each other) to dynamic friction (where second riser pin portion 64 rotates independently of and with respect to stationary first riser pin portion 62). In the preferred embodiment, the torque required to be applied to optical tool holder surface 46' to achieve dynamic friction between riser pin portions 62 and 64 is in the range of approximately 4–12 in-lbs. As such, once the operator has threaded optical tool holder 30 and optical tool 24 to riser pin front end 48, he/she observes where the marking on holder front end 46 comes to rest. If it does not come to rest at the position of gate 14, the operator applies the needed torque to the wrench (engaging hexed surface 46') to rotate front riser pin portion 64 independently of back riser pin portion 68 until the marking is at the position of gate 14. This positions the toric surface at the gate as described above.

What is claimed is:

1. Apparatus for selectively, rotationally aligning a predetermined characteristic on an asymmetrical mold surface of a mold tool with the gate of an injection molding machine wherethrough liquid mold material is injected into a mold cavity defined at least in part by said mold surface, said apparatus comprising:

a) a riser pin having first and second, co-linear portions each having front and back ends, said riser pin first portion back end being secured in rotationally fixed relationship within said injection molding machine, said mold tool being secured to said front end of said riser pin second portion; and b) means attaching said front end of said riser pin first portion to said back end of said riser pin second portion in a rotationally adjustable manner whereby said mold tool may be rotated with said riser pin front portion independently of said riser pin back portion to enable alignment of said predetermined characteristic on said mold surface with said gate of said injection molding machine.

2. The apparatus of claim 1 and further comprising means biasing riser pin back and front portions together.

3. The apparatus of claim 2 wherein said attaching means comprises a screw having a head and threaded shank portion which extends through axially aligned bore holes formed in said back and front portions of said riser pin with said bore hole in said riser pin front portion being threaded and said shank portion of said screw being threadedly engaged in said front portion bore hole.

4. The apparatus of claim 3 wherein said biasing means comprises a plurality of spring washers positioned about said screw shank portion within said bore hole of said riser pin back portion.

5. The apparatus of claim 4 and further comprising a washer positioned between said riser pin back and front portions.

6. The apparatus of claim 1 wherein said mold surface is a contact lens mold surface and said predetermined characteristic is a toric surface on said contact lens mold surface.

7. The apparatus of claim 1 and further comprising a tail piece having threaded front and back ends, said tail piece back end being threadedly engaged to said riser pin front portion front end, and said tail piece front end being threadedly engaged to said mold tool opposite said mold surface.

8. The apparatus of claim 7 and further comprising a holder having a cavity into which said mold tool is removably received, said holder having an axial bore formed entirely therethrough and through which said tail piece front end extends to engage said mold tool.

\* \* \* \* \*